US009241186B2

(12) United States Patent
Kummer

(10) Patent No.: US 9,241,186 B2
(45) Date of Patent: *Jan. 19, 2016

(54) SYSTEMS AND METHODS FOR SECURELY PROVIDING ADAPTIVE BIT RATE STREAMING MEDIA CONTENT ON-DEMAND

(71) Applicant: EchoStar Technologies L.L.C., Englewood, CO (US)

(72) Inventor: David A. Kummer, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/176,010

(22) Filed: Feb. 7, 2014

(65) Prior Publication Data

US 2014/0282689 A1 Sep. 18, 2014

Related U.S. Application Data

(63) Continuation of application No. 13/900,357, filed on May 22, 2013.

(60) Provisional application No. 61/779,979, filed on Mar. 13, 2013.

(51) Int. Cl.
*H04N 21/4408* (2011.01)
*H04N 21/472* (2011.01)
(Continued)

(52) U.S. Cl.
CPC ....... *H04N 21/4408* (2013.01); *H04N 21/2347* (2013.01); *H04N 21/23439* (2013.01);
(Continued)

(58) Field of Classification Search
CPC ....... H04N 7/16; H04N 7/167; H04N 7/1675; H04N 21/23476; H04N 21/25816; H04N 21/26258; H04N 21/26613; H04N 21/63345; H04N 7/17; H04N 7/17318; H04N 21/25875; H04N 21/4181; H04N 21/42204; H04N 21/4623; H04N 21/2347; H04N 21/23473; H04N 21/23439; H04N 21/2662; H04N 21/4126; H04N 21/4182; H04N 21/422; H04L 63/0435; H04L 65/4076; H04L 63/0457; H04L 63/0823
See application file for complete search history.

(56) References Cited

U.S. PATENT DOCUMENTS 5,412,730 A 5/1995 Jones
6,055,314 A 4/2000 Spies et al.
(Continued)

FOREIGN PATENT DOCUMENTS

EP 0 843 449 A2 5/1998
EP 1 150 506 A2 10/2001

OTHER PUBLICATIONS

Claude Ostyn, Using a reverse proxy for SCORM Delivery from Separate Servers, Version 0.5—Sep. 6, 2004—Draft in Progess, Copyright 2004 Avanced Distributed Learning.*

(Continued)

*Primary Examiner* — Hai V Tran
(74) *Attorney, Agent, or Firm* — Seed IP Law Group PLLC

(57) ABSTRACT

A system for securely providing adaptive bit rate streaming media content on-demand may include a security sever of a program distributor that selects, based on a received authorized request, which of a differently encrypted stored versions of a "special segment" of the requested program to deliver to the receiving device during the transmission of the requested program. The selection may be based on a pseudo-random selection process per request for the program based on an identifier of the request associated with the remote control device. The selection of which of the differently encrypted stored versions of the "special segment" of the ordered program to deliver may be based on the current session. The secure remote then sends to the receiving device the correct decryption key for the receiving device to decrypt the particular encrypted version selected of the "special segment" to be sent to the receiving device.

19 Claims, 8 Drawing Sheets

(51) Int. Cl.
  *H04N 21/2343* (2011.01)
  *H04N 21/845* (2011.01)
  *H04N 21/2347* (2011.01)
  *H04N 21/454* (2011.01)
  *H04N 21/266* (2011.01)
  *H04N 21/41* (2011.01)
  *H04N 21/658* (2011.01)

(52) U.S. Cl.
  CPC ..... *H04N21/26613* (2013.01); *H04N 21/4126* (2013.01); *H04N 21/454* (2013.01); *H04N 21/47202* (2013.01); *H04N 21/6581* (2013.01); *H04N 21/8456* (2013.01)

(56) References Cited

U.S. PATENT DOCUMENTS

| | | | |
|---|---|---|---|
| 6,804,357 | B1 | 10/2004 | Ikonen et al. |
| 6,993,134 | B1 | 1/2006 | Epstein |
| 7,926,078 | B2 | 4/2011 | Arsenault et al. |
| 2001/0016836 | A1 | 8/2001 | Boccon-Gibod et al. |
| 2005/0013437 | A1* | 1/2005 | Ikonen et al. ................ 380/241 |
| 2006/0085821 | A9 | 4/2006 | Simmons et al. |
| 2006/0150211 | A1 | 7/2006 | Ritter |
| 2007/0118762 | A1 | 5/2007 | Master et al. |
| 2007/0217612 | A1 | 9/2007 | So |
| 2011/0231660 | A1* | 9/2011 | Kanungo ..................... 713/168 |
| 2011/0246616 | A1 | 10/2011 | Ronca et al. |

OTHER PUBLICATIONS

Anonymous; "Text of ISO/IEC JTC 1/SC 29 N; Information technology—Dynamic adaptive streaming over HTTP (DASH)—Part 4: Segment encryption and authentication"; MPEG Meeting; May 12, 2012; 22 pages.

Hartung et al.; "DRM Protected Dynamic Adaptive HTTP Streaming"; URL:http://www.hartung.fh-aachen.de/publications/ACM_MMSys2011_p277.pdf; retrieved from internet Jun. 3, 2013; 6 pages.

Pantos et al.; "HTTP Live Streaming; draft-pantos-http-live-streaming-10.txt"; Internet Engineering Task Force (IETF); Oct. 15, 2012; 38 pages.

ISR/Written Opinion for International Application No. PCT/US2014/018263; mailed Jun. 2, 2014; 13 pages.

International Search Report and Written Opinion, dated Jan. 23, 2014, for International Application No. PCT/US2013/067137, 16 pages.

* cited by examiner

SYSTEMS AND METHODS FOR SECURELY PROVIDING ADAPTIVE BIT RATE STREAMING MEDIA CONTENT ON-DEMAND

TECHNICAL FIELD

The technical field relates to delivering media content, and particularly to providing media content securely to multiple different recipients.

BRIEF SUMMARY

Each of multiple receiving devices at various customer locations may request the same or different streaming media content (e.g., stored at a content storage system of a content delivery network) on-demand using video on-demand (VOD) or other available on-demand services and/or applications associated with, in communication with or running on the respective receiving devices. Differently encrypted versions of particular, i.e., "special" segments of the ordered program may already be stored at the content storage system of the content delivery network. Each differently encrypted version of a special segment has a different decryption key which is for decrypting the corresponding differently encrypted version of that special segment. In contrast, other segments, i.e., "non-special" segments of the requested program, are each encrypted once using the same or different encryption key from each other.

In conjunction with this request for the streaming media program, the secure remote sends a unique code associated with the secure remote to the content storage system of the content delivery network via the receiving device. If the request is approved and/or authenticated by the program distributor and/or the content storage system of the content delivery network based on the unique code, a security server of the program distributor may then send an authorization to the secure remote. For example, this may be an authorization code that allows or enables the secure remote to derive the decryption key for the "non-special" segments. The content storage system of the content delivery network may then begin to transmit the stored encrypted program in response to the order. The secure remote then sends this decryption key, or a portion thereof, to the receiving device for decryption of those "non-special" segments.

During transmission of the requested program, or prior to the transmission, once the content storage system of the content delivery network encounters one of those "special segments" that have been differently encrypted a number of times and stored on the content storage system of the content delivery network, the content storage system of the content delivery network may send a request to the program distributor for information regarding which of the differently encrypted stored versions of the "special segment" of the ordered program to deliver to the receiving device during the transmission of the ordered program to the receiving device.

The program distributor may then select, or have pre-selected based on the received authorized request, which of the differently encrypted stored versions of the "special segment" of the ordered program to deliver to the receiving device during the transmission of the ordered program based on a random or pseudo-random selection process. This may also be based on the particular request or order for the streaming media content program, such as by performing the random or pseudo-random selection process per request for the program based on an identifier of the request associated with the remote control device. In this manner, the selection of which of the differently encrypted stored versions of the "special segment" of the ordered program to deliver is based on the current session, i.e., current request and associated transmission, for the requested program.

The secure remote then sends to the receiving device the correct decryption key for the receiving device to decrypt the particular encrypted version selected of the "special segment" to be sent to the receiving device. The secure remote may have pre-stored corresponding encryption and/or decryption keys and/or corresponding encryption algorithms and information associating which of these correspond with each of the differently encrypted versions of the "special" segment(s).

BRIEF DESCRIPTION OF THE DRAWINGS

The components in the drawings are not necessarily to scale relative to each other. Like reference numerals designate corresponding parts throughout the several views.

DETAILED DESCRIPTION

Video on Demand (VOD) is a system which allows a user to select, watch and/or listen to video and audio content on demand. For example "Internet Television" and "Internet Protocol Television" (IPTV) are systems through which various media content is delivered using the Internet protocol (IP) suite over a packet-switched network such as the Internet, instead of being delivered through traditional channels using terrestrial, satellite signal, and cable television formats. In such situations, the device used to receive the content may often be other user equipment than the set-top box provided by the cable provider, satellite provider, or other program distributor to which the customer subscribes for such on-demand services. These may include various user devices such as a television, a digital video recorder (DVR), digital versatile disc (DVD) player, personal computer (PC), tablet device, game machine, smart phone, mobile device or other computing device or media player not provided by or controlled by the cable provider, satellite provider, or other program distributor to which the customer subscribes for the on-demand services. In such situations, it may be more difficult for the cable provider, satellite provider or program distributor to securely provide such on demand services to those devices and also accommodate adaptive bit rate streaming, because of the decryption which must usually occur at the device receiving the content in order to present the content to the user and due to there being no unique hardware or software control of such devices by the service provider or program distributor.

Also, it may take significant processing power and time to encrypt the content differently per on-demand request and/or per user based on information received from a secure remote control device associated with the user to provide the additional security and control desired. However, the systems and methods described herein provide solutions which overcome this difficulty and enable the cable service provider, satellite service provider or other program distributor to more easily provide streaming media content to such devices in a secure manner, while also accommodating adaptive bit rate streaming, using a secure remote control device of the user that may be provided or configured by the cable service provider, satellite service provider or other program distributor.

Figure 1:
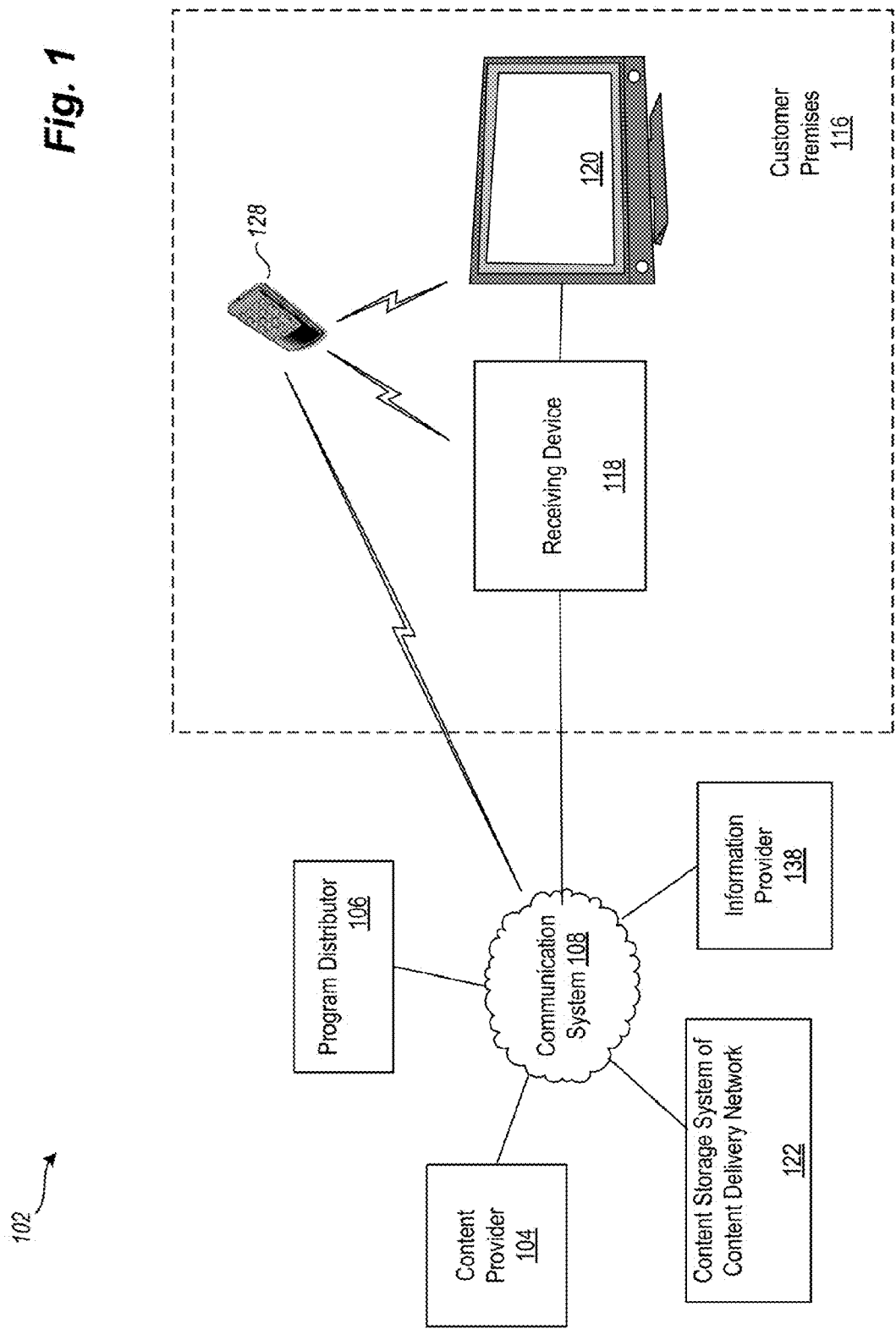
FIG. 1 is an overview block diagram illustrating an example content distribution environment in which embodiments of securely providing adaptive bit rate streaming media content on-demand may be implemented, according to one example embodiment.

FIG. 1 is an overview block diagram illustrating an example content distribution environment in which embodiments of securely providing adaptive bit rate streaming media content on-demand may be implemented, according to one example embodiment.

Before providing additional details regarding the operation and constitution of methods and systems for securely providing adaptive bit rate streaming media content on-demand, the example content distribution environment 102, within which such a system may operate, will briefly be described.

In the content distribution environment 102, audio, video, and/or data service providers, such as television service providers, provide their customers a multitude of video and/or data programming (hereafter, collectively and/or exclusively "programming"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments any of this programming may be provided as a type of programming referred to as streaming media content, which is generally digital multimedia data that is substantially constantly received by and presented to an end-user or presented on a device while being delivered by a provider from a stored file source. Its verb form, "to stream", refers to the process of delivering media in this manner. The term refers to how the media is delivered rather than the media itself.

The receiving device 118 interconnects to one or more communications media or sources. For example, the various media content may be delivered as data using the Internet protocol (IP) suite over a packet-switched network such as the Internet or other packet-switched network. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

For convenience, examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the receiving device 118 may be any suitable converter device or electronic equipment that is operable to receive or playback programming. Further, the receiving device 118 may itself include user interface devices, such as buttons or switches. In some example embodiments, the receiving device 118 may be configured to receive and decrypt content according to various digital rights management (DRM) and other access control technologies and architectures as part of the process of securely providing adaptive bit rate streaming media content on-demand to the receiving device 118, which will be described in further detail below.

In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like, including, but not limited to devices using Bluetooth® wireless technology, Wi-Fi® wireless technology, Radio Frequency for Consumer Electronics (RF4CE) wireless technology, etc. In the present example embodiment, the remote 128 is a "secure" remote configured according to an example embodiment to enable securely providing adaptive bit rate streaming media content on-demand to the receiving device 118, which will be described in further detail below. In other embodiments, the secure remote 128 could instead or also be a smart phone, tablet or other device that could have a secure software program and/or hardware elements that would allow the service provider to use it with better security resources than the receiving device 118.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, such as the program distributor 106. Example content providers include television stations which provide local or national television programming and special content providers which provide premium based programming, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In at least one embodiment, the received program content is converted by the program distributor 106 into a suitable signal (a "program signal") that is ultimately communicated to the receiving device 118. Various embodiments of the receiving device 118 may instead receive programming from program distributors 106 and/or directly from content providers 104 via locally broadcast RF signals, cable, fiber optic, Internet media, or the like via the communication system 108, such as from the content storage system of a content delivery network 122.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet protocol (IP) suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the content distribution environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content via the communications system 108 from files stored at the content storage system of the content delivery network 122, under direct or indirect control of the program distributor 106, to the receiving device 118. The content storage system of the content delivery network 122 may also comprise multiple separate storage facilities and streaming media content servers geographically separated from each other, each of which (also referred to as an "edge cache") streams stored media content to particular customer locations based on a number of factors such as proximity of the customer premises 116 to the individual content storage system of the content delivery network 122 location or edge cache, load balancing parameters, current demand on the individual content storage system of the content delivery network 122, capacity of the individual content storage system of the content delivery network 122, etc.

Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the customer premises 116, or download it to a receiving device 118 such as a computer, DVR (also called a personal video recorder) or portable media player for viewing at any time. The program distributor 106 may offer VOD streaming, including pay-per-view and free content, whereby a user buys or selects a movie or television program and it begins to play on the presentation device 120 almost instantaneously, offer downloading of the media content to a DVR rented from the program distributor, and/or offer downloading the content onto a computer or mobile device, for viewing in the future.

In some embodiments, the receiving device 118 may be a set-top box that is typically provided by the cable provider, satellite provider, or other program distributor 106 to which the customer may subscribe to receive such on-demand services and that also receives programming through traditional channels using a terrestrial, satellite signal, and/or cable television format. However, in many embodiments, the receiving device 118 may instead be other user equipment than the set-top box such as a television, DVR, DVD player, Tablet, PC, Smart Phone or other media player not provided by or controlled by the cable provider, satellite provider, or other program distributor 106 to which the customer subscribes for such on-demand services. In such situations where the receiving device 118 is not provided by or controlled by the cable provider, satellite provider, or other program distributor 106 to which the customer subscribes for such on-demand services, it may be more difficult for the program distributor 106 to securely provide such on demand services to those devices because of the decryption which must usually occur at the receiving device in order to present the content to the user and due to there being no unique hardware or software control of such devices by the program distributor 106 or other service provider.

Also, it may take significant processing power and time to encrypt the content differently per on-demand request and/or per user based on information received from a secure remote control device 128 associated with the user to provide the additional security and control desired. However, the systems and methods described herein for securely providing adaptive bit rate streaming media content on-demand provide solutions which overcome this difficulty and enables program distributors to more easily securely provide streaming media content to such devices, while also accommodating adaptive bit rate streaming.

In addition, information provider 138 may provide various forms of content and/or services to various devices residing in the customer premises 116. For example, Information provider 138 may also provide information to the receiving device 118 regarding insertion of advertisement or other additional content or metadata into a media content segment provided to the receiving device 118. In some embodiments, such advertisements or other additional content or metadata may be provided by an advertisement server to the content provider 104, directly to the receiving device 118 or be inserted into the streaming media stored on the content storage system of the content delivery network 122 or as it is being streamed to the receiving device 118. The information provider 138 may also or instead be another third party entity providing security data and/or services related to authentication, encryption, digital media rights, etc., on behalf of the program distributor 106 or other authorized entity.

In the illustrated example, one or more of the content provider 104, information provider 138 and/or content storage system of the content delivery network 122 may also transmit and receive additional information than the streaming media content to and from the receiving device 118 over one or more channels within the communication system 108. For example, the content provider 104, information provider 138 and/or content storage system of the content delivery network 122 may transmit and receive indications to and from the receiving device 118 and/or secure remote control 128 regarding encryption or decryption of the streaming media content (e.g., encryption or decryption keys), information regarding differently encrypted versions of one or more same segments of a requested media content program, requests for streaming media content programs, identification of the user or user account, identification of the receiving device, authentication information, information related to digital media rights of the streaming media content, additional metadata, etc. Some or all of this additional information and metadata may also be encrypted.

For example, a user at the customer premises 116 may use the secure remote 128, which is provided to the user by the program distributor 106 or other VOD service provider, to order a VOD program via the receiving device 118 using a VOD and/or other software application running thereon. The receiving device 118 may transmit the VOD request for the ordered program to the content storage system of the content delivery network 122 or to the program distributor 106, which is then ultimately received by the content storage system of the content delivery network 122. Differently encrypted versions of particular, i.e., "special" segments of the ordered program may already be stored at the content storage system of the content delivery network 122. For example, one or more pluralities of encrypted segments may each include about one hundred encrypted versions a different corresponding "special" segment, but this number may vary and be adjusted based on desired level of security and available storage space. Each differently encrypted version of a special segment has a different decryption key which is for decrypting the corresponding differently encrypted version of that special segment. In contrast, other segments, i.e., "non-special" segments of the requested program, are each encrypted once using the same or different encryption key from each other.

In conjunction with this request, the secure remote 128 may send a unique code associated with the secure remote 128 (and thus the user) to the content storage system of the content delivery network 122 via the receiving device 118. If the request is approved and/or authenticated by the program distributor 106 and/or the content storage system of the content delivery network 122 based on the unique code, a security server of the program distributor 106 or of the content storage system of the content delivery network 122 may then send an authorization to the secure remote 128, either directly via the communication system 108, or via the receiving device 118, such as an authorization code that allows or enables the secure remote 128 to derive the decryption key for the "non-special" segments. The content storage system of the content delivery network 122 may then begin to transmit the stored encrypted program in response to the order. The secure remote then sends this decryption key, or a portion thereof, to the receiving device 118 for decryption of those "non-special" segments. This decryption key, or the portion thereof, for decryption of those "non-special" segments may also be sent in an encrypted manner from the secure remote 128 to the receiving device.

During transmission of the ordered program, or prior thereto, once the content storage system of the content delivery network 122 encounters one of those "special segments" that have been differently encrypted a number of times and stored on the content storage system of the content delivery network 122, the content storage system of the content delivery network 122 may send a request to the program distributor 106. This request may be for information regarding which of the differently encrypted stored versions of the "special segment" of the ordered program to deliver to the receiving device 118 during the transmission of the ordered program to the receiving device 118. The program distributor 106 may then select, or have already pre-selected based on the received authorized request, which of the differently encrypted stored versions of the "special segment" of the ordered program to deliver to the receiving device 118 during the transmission of the ordered program based on a random or pseudo-random selection process. This may also be based on the particular request or order for the streaming media content program, such as by performing the random or pseudo-random selection process per request for the program based on an identifier of the request associated with the remote control device 128. In this manner, the selection of which of the differently encrypted stored versions of the "special segment" of the ordered program to deliver is based on the current session, i.e., current request and associated transmission, for the requested program.

The secure remote 128 then sends to the receiving device 118 the correct decryption key for the receiving device 118 to decrypt the particular encrypted version selected of the "special segment" to be sent to the receiving device 118. The secure remote 128 may have pre-stored corresponding encryption and/or decryption keys and/or corresponding encryption algorithms and information associating which of these correspond with each of the differently encrypted versions of the "special" segment(s). Thus, in one embodiment, the secure remote 128 may select the applicable decryption key based on the program distributor 106 and/or the content storage system of the content delivery network communicating to the secure remote control 128 an identifier of which of the differently encrypted versions of the "special segment" of the ordered program was selected to be delivered in response to the current request or session. Alternatively, the secure remote 128 may also track what the current request is based on the program having been ordered using the secure remote 128 and use the same random or pseudo-random selection algorithm used by the program distributor 106 or the content storage system of the content delivery network 112 to determine which of the differently encrypted versions of the "special segment" of the ordered program is to be delivered from the content storage system of the content delivery network 122 to the receiving device 118 based on the current request or session. The secure remote 128 may then select from the decryption keys pre-stored in the secure remote associated with each differently encrypted version of the "special segment" accordingly.

In some embodiments, the current request may be identified by or associated with an identifier that is communicated to the receiving device 118 from the program distributor 106 or content storage system of the content delivery network 122, which is in turn displayed on the presentation device 120 with a prompt for the user to enter this identifier or select some sequence of numbers and buttons on the secure remote based on this identifier. This identifier, for example, is the same identifier based on which the program distributor 106 or the content storage system of the content delivery network 122 selected which differently encrypted version of the "special segment" of the ordered program to deliver to the receiving device 118 during transmission of the requested program. Therefore, using this same identifier and random or pseudo-random selection algorithm, the secure remote 128 can then determine which of the differently encrypted versions of the "special segment" of the ordered program was or will be selected for delivery to the receiving device 118 in response to the current request corresponding to the current session.

In this manner, different encrypted versions of the streaming media program need not be generated upon each request for the program and thus, processing time for encrypting the program for each request is saved while also providing the added security benefit of delivering a different encrypted version of "special" program segments per each request. This hinders potential content pirates from easily obtaining the required decryption key or keys for subsequent orders of the program because they would have to order the same program over and over again a number of times relative to how many times as each "special segment" of the program is differently encrypted in an attempt to intercept all the possible decryption keys.

In one example embodiment, the differently encrypted "special segments" stored in the content storage system of the content delivery network 122 represent a certain total amount (e.g., a pre-determined percentage such as 10% or 20%, etc., of the total requested program) of streaming media content programs available on-demand and are encrypted using a unique encryption key, contribution key, partial key and/or pseudo-random number stored in or derived by the secure remote 128 as described herein. For example, the differently encrypted "special segments" stored in the content storage system of the content delivery network 122 may each represent two second segments of the requested program and may appear dispersed between "non-special" encrypted segments of the requested program, but other time intervals and/or corresponding segment sizes may be used. These "non-special" encrypted segments of the requested program may have been encrypted using one encryption key common to one or more of the "non-special" encrypted segments, which are stored on or derived by the secure remote 128 based on various factors which have been previously communicated to or otherwise may be known by the secure remote 128. For example, these various factors may include communication of an authorization code communicated from the program distributor 106 and/or content storage system of the content delivery network 122.

In some embodiments, at least some of the differently encrypted versions are encrypted versions of the same segment at different bit rates. The content storage system of the content delivery network 122 may deliver an encrypted version of the segment according to a bit rate selected to enable the receiving device 118 to receive the encrypted segment at the bit rate selected based on a varying bit rate for transmission of the streaming media content program to the first remote receiving device. This may be based on the current request of the streaming media program or session corresponding to the current request. In some embodiments, the differently encrypted versions include about one hundred encrypted versions of the same segment at each of the different bit rates, but this number may vary and be adjusted according to the level of security desired. In this way, the bit rate may be changed during transmission to the receiving device 118 dynamically according to current network conditions, receiving device 118 and/or presentation device 120 requirements, and other factors affecting bit rate.

As mentioned above, in various different embodiments, the content provider 104, information provider 138 and/or content storage system of the content delivery network 122 may transmit and receive indications to and from the receiving device 118 and/or secure remote control 128 regarding encryption or decryption of the streaming media content (e.g., encryption or decryption keys), information regarding differently encrypted versions of one or more same segments of a requested media content program, requests for streaming media content programs, identification of the user or user account, identification of the receiving device, authentication information, information related to digital media rights of the streaming media content, additional metadata, etc. Some or all of this additional information and metadata may also be encrypted. Thus, in another alternative embodiments, a server of the program distributor 106, content provider 104, information provider 138 and/or a secure server of another entity may perform the function of a relay server that selects which of the "special segments" to retrieve when encountered by the receiving device or content storage system of the content delivery network 122.

For example, the client (e.g., the receiving device 118) sends a request for a "special segment" to the relay server over the Internet via a uniform resource locator (URL). The relay server then selects, or has already pre-selected based on an initial received authorized request, which of the differently encrypted stored versions of the "special segment" of the ordered program to deliver based on a random or pseudo-random selection process. The relay server then requests that stored segment (e.g., using the random or pseudo-random number to identify the stored segment) from the content storage system of the content delivery network 122 and relays that special segment to the client. In this way, the content storage system of the content delivery network 122 does not need to know or otherwise have information regarding what is occurring with respect to delivery of the special segment to a particular client. Also, for increased security, the relay server may translate the URL requested to a different format understood by the content storage system of the content delivery network 122, but unknown to the client, so that the client does not know where to retrieve those "special segments" off of the content storage system of the content delivery network 122.

Encryption and decryption described herein may be performed as applicable according to one or more of any number of currently available or subsequently developed encryption methods, processes, standards and/or algorithms including, but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the content distribution environment 102, the customer premises 116, and the various devices therein, is intended as a broad, non-limiting overview of an example environment in which various embodiments of securely providing adaptive bit rate streaming media content on-demand may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement securely providing adaptive bit rate streaming media content on-demand. Other embodiments of the described techniques may be used for other purposes, including securely providing adaptive bit rate streaming media content on-demand to be played on various other receiving devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
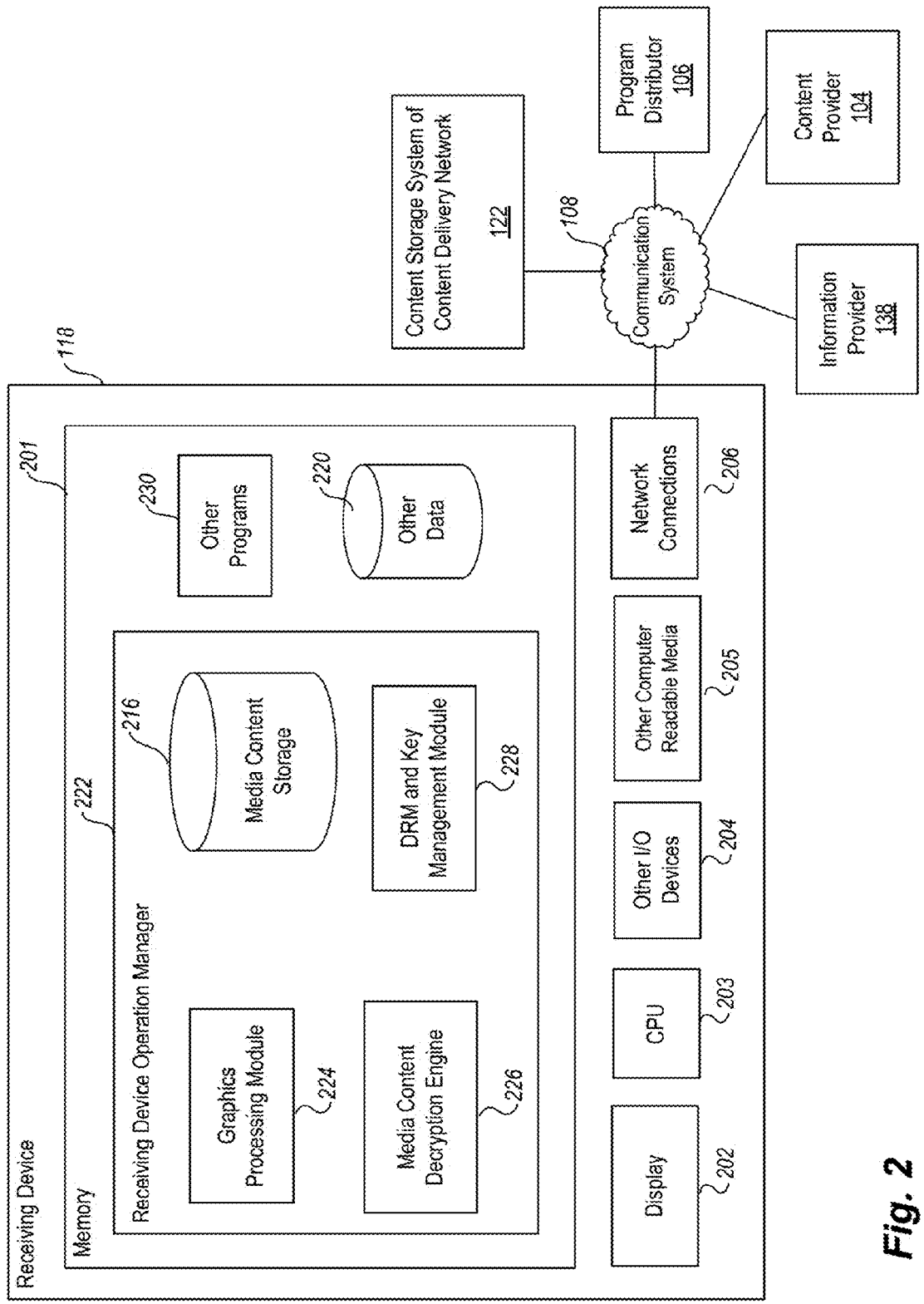
FIG. 2 is a block diagram illustrating elements of an example receiving device used in securely providing adaptive bit rate streaming media content on-demand, according to one example embodiment.

FIG. 2 is a block diagram illustrating elements of an example receiving device used in securely providing adaptive bit rate streaming media content on-demand, according to one example embodiment.

In one embodiment, the receiving device 118 is a device such as a television, DVR, DVD player, PC, tablet device, game machine, smart phone, mobile device or other computing device or media player configured to receive and process streaming media content programs and to display such programming on a presentation device. In other embodiments, the receiving device 118 is a set-top box configured to receive, process and display on a presentation device streaming media content programs and/or other programming such as cable or satellite television broadcasts via various other physical and logical channels of communication.

Note that one or more general purpose or special purpose computing systems/devices may be used to operate the receiving device 118; store information regarding the receiving device 118, store metadata, perform DRM and key management operations, decrypt received content; and communicate with the content provider 104, secure remote 128, program distributor 106, information provider 138 and/or content storage system of the content delivery network 122. In addition, the receiving device 118 may comprise one or more distinct computing systems/devices and may span distributed locations. Furthermore, each block shown may represent one or more such blocks as appropriate to a specific embodiment or may be combined with other blocks. Also, the receiving device operation manager 222 may be implemented in software, hardware, firmware, or in some combination to achieve the capabilities described herein.

In the embodiment shown, receiving device 118 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output devices 204 (e.g., keyboard, mouse, RF or infrared receiver, universal serial bus (USB) ports, other communication ports, and the like), other computer-readable media 205, and network connections 206. The receiving device operation manager 222 is shown residing in memory 201. In other embodiments, some portion of the contents and some, or all, of the components of the receiving device operation manager 222 may be stored on and/or transmitted over the other computer-readable media 205. The components of the receiving device 118 and operation manager 222 preferably execute on one or more CPUs 203 and facilitate the receiving, decrypting, decoding, processing, selecting, recording, playback and displaying of programming, as described herein. The receiving device operation manager 222 may also facilitate on-demand media services (e.g., VOD services), on-demand program ordering, processing and DRM and key management and storage corresponding to processing received streaming media content and other programming. The receiving device operation manager 222 may operate as, be part of, or work in conjunction and/or cooperation with various on-demand service software applications stored in memory 201. The receiving device operation manager 222 also facilitates communication with peripheral devices and the secure remote 128, via the I/O devices 204 and with remote systems (e.g., the content provider 104, the content storage system of the content delivery network 122, the program distributor 106, and/or the information provider 138) via the network connections 206.

Recorded or buffered programming received as streaming media content or other types of programming may reside on the media content storage 215, either in decrypted or encrypted form as applicable for securely storing, processing and displaying of the received media content according to the applicable DRM associated with the particular programming. The media content storage 215 may also store various program metadata associated with the recorded or buffered programming stored in the media content storage 215, such as that including, but not limited to, DRM data, tags, codes, identifiers, format indicators, timestamps, user identifications, authorization codes, digital signatures, etc.

The DRM and key management module 228 is configured to store decryption keys and other authorization or identification codes as applicable in a secure area of the memory 201 and enable the receiving device 118 to execute the DRM policies and rules associated with received media content. The DRM and key management module 228 may be part of or work in conjunction with various on-demand service (e.g., VOD) software applications used to enable a user to order streaming media content programs and other programming via the receiving device 118.

The media content decryption engine 226 is configured to decrypt streaming media content as it is being received by the receiving device 118 using the applicable decryption key(s) stored by the DRM and key management module according to the DRM and/or VOD software application also residing in memory 201 or other memory 230.

The graphics processing module 224 is configured to process the decrypted streaming media content and render the data for display on a particular presentation device according to specifications and requirements of the presentation device. The graphics processing module 224 may decode, decompress, format, translate, perform digital signal processing, adjust data rate and/or complexity or perform other processing on the data representing received streaming media content as applicable for presenting the received content in real time on the presentation device as it is being received by the receiving device 118.

Other code or programs 230 (e.g., further audio/video processing modules, a program guide manager module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation.

For example, some embodiments may not provide other computer readable media 205 or a display 202.

In some embodiments, the receiving device 118 and operation manager 222 includes an application program interface ("API") that provides programmatic access to one or more functions of the receiving device 118 and operation manager 222. For example, such an API may provide a programmatic interface to one or more functions of the receiving device operation manager 222 that may be invoked by one of the other programs 230, the secure remote 128, the program distributor 106, the content provider 104, information provider 138, content storage system of the content delivery network 122 or some other module. In this manner, the API may facilitate the development of third-party software, such as various different on-demand service applications, user interfaces, plug-ins, adapters (e.g., for integrating functions of the receiving device operation manager 222 and information provider 138 into desktop applications), and the like to facilitate securely providing adaptive bit rate streaming media content on-demand using the receiving device 118.

In an example embodiment, components/modules of the receiving device 118 and operation manager 222 are implemented using standard programming techniques. For example, the receiving device operation manager 222 may be implemented as a "native" executable running on the CPU 203, along with one or more static or dynamic libraries. In other embodiments, the receiving device 118 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to receive decryption keys, access codes, identifications codes, etc., from external devices such as wirelessly from the secure remote 128 or other external secure device, and to decrypt or descramble such received information as applicable and transmit one or more of such codes with or in conjunction with transmitting a request for a streaming media program to a remote system according to on-demand service software applications running on the receiving device 118. The instructions cause the CPU 203 or some other processor, such as an I/O controller/processor, to receive, decrypt and process the requested streaming media program for display on a presentation device using the received decryption key.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer (e.g., Bluetooth® wireless technology providing a communication channel between the receiving device 118 and the secure remote 128), running on one or more computer systems each having one or more CPUs or other processors. Some embodiments may execute concurrently and asynchronously, and communicate using message passing techniques. Equivalent synchronous embodiments are also supported by a receiving device operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and operation manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The media content storage 216 and other data 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
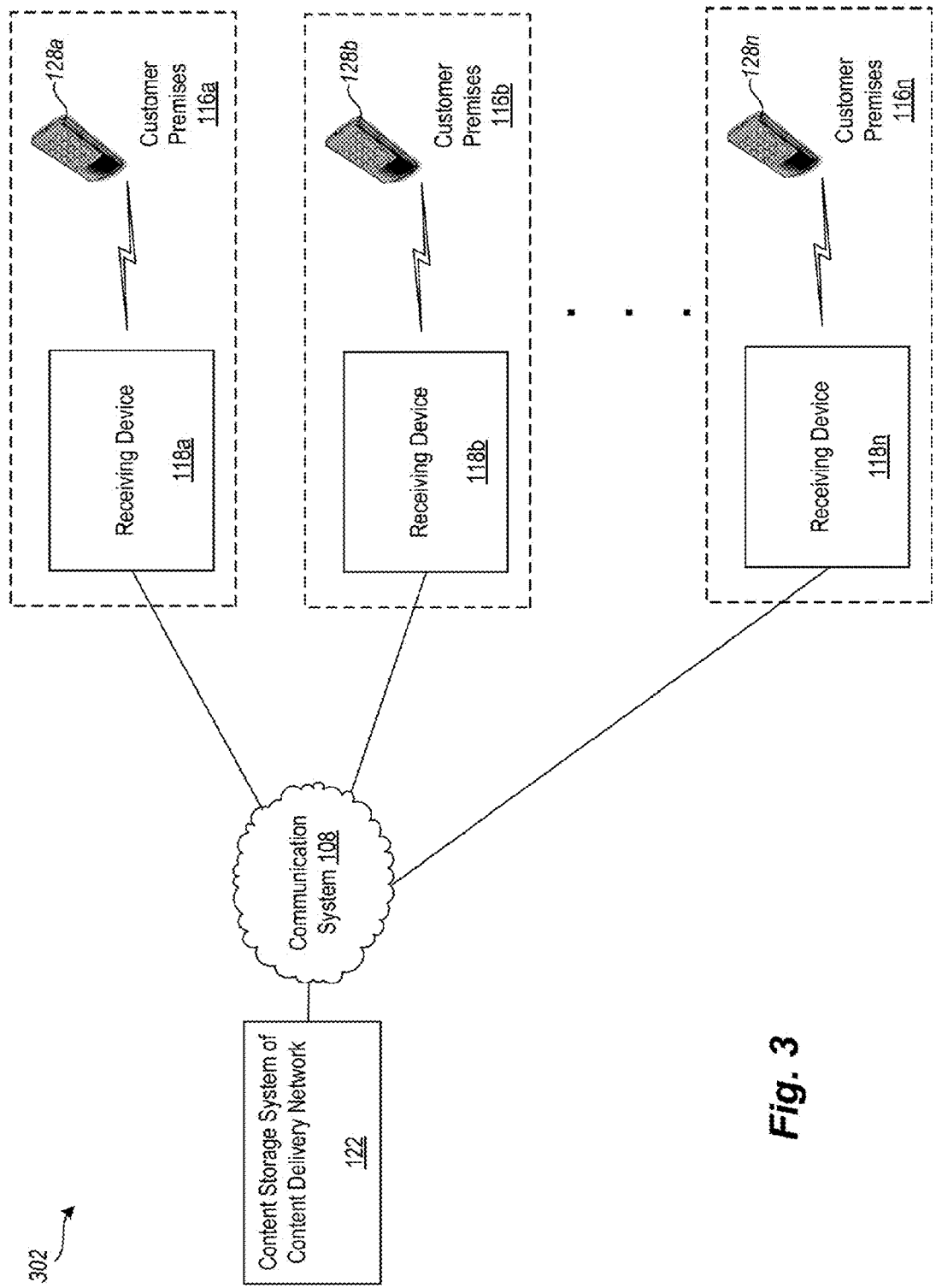
FIG. 3 is a block diagram of an example content storage system of a content delivery network in operable communication with multiple remote example receiving devices such as that of FIG. 2 to which streaming media content is securely provided on-demand, according to one example embodiment.

FIG. 3 is a block diagram of an example content storage system of a content delivery network 122 in operable communication with multiple remote example receiving devices 118a to 118n such as that of FIG. 2 to which streaming media content is securely provided on-demand, according to one example embodiment.

In one embodiment, the receiving devices 118a to 118n are not controlled or provided by the program distributor 106 or other entity providing the on-demand service via the content storage system of the content delivery network 122. For example, receiving devices 118a to 118n may be any combination of Internet connected televisions, DVRs, DVD players, PCs, tablet devices, game machines, smart phones, mobile devices or other computing devices or media players not controlled or provided by the program distributor 106 or other entity providing the on-demand service via the content storage system of the content delivery network 122. However, each receiving device 118a to 118n may request the same or different streaming media content (stored at the content storage system of the content delivery network 122) on-demand using VOD or other available on-demand services and/or applications associated with, in communication with or running on the respective receiving devices 118a to 118n. In response, the content storage system of the content delivery network 122 will deliver the requested content uniquely for each received request (e.g., according to selections of stored differently encrypted special segments of the requested program that are unique for each request) and deliver the encrypted requested content to the appropriate respective receiving device of the receiving devices 118a to 118n. The respective receiving devices 118a to 118n will then each decrypt the streaming content as it is being received and cause it to be displayed according to the corresponding decryption key communicated from the respective individual remote 128a to 128n to the respective receiving device 118a to 118n in conjunction with the respective request.

For example, the user at customer premises 116a may use their individual secure remote 128a that was provided by the program distributor to order a movie on-demand to be delivered as streaming content to their respective receiving device 118a (e.g., their Internet-connected television) via communication system 108. The user selects the movie using their secure remote 128a from an electronic program guide (EPG) displayed on their television by pressing a button on their secure remote 128a. In response to pressing on this button, the secure remote then communicates an identification code (which may in many instances be sent in the clear or unencrypted manner) wirelessly to the receiving device 118a. However, the code may be otherwise transmitted by the secure remote 128a to the receiving device 118a in conjunction with the user operating the remote 128a to order the movie, such as by pressing a special designated button on the secure remote 128a different than that used to select the movie and/or a button pressed in response to a prompt displayed on the EPG.

The code may be provided wirelessly by the secure remote 128a to the receiving device 118a, such that the receiving device 118a can then transmit the code to the content storage system of the content delivery network 122 and/or program distributor 106 when the request for the streaming media content program is transmitted by the receiving device 118. In one embodiment, this unique code is unique to the secure remote 128a and may be pre-programmed and stored in the secure remote 128a (which may be manufactured, controlled, modified and/or provided to the user by the program distributor 106 or other entity providing or making available the on-demand service). The secure remote 128a is provided to the user who is uniquely associated with that code, and thus also the secure remote 128a, for authentication purposes to order the VOD programming.

Once the content storage system of the content delivery network 122 and/or program distributor 106 authenticates the request, such as by using the received code to associate the request with an authorized user or identifier of an authorized user, the content storage system of the content delivery network 122 may deliver the requested program and particular differently encrypted special segments as instructed by the program distributor 106 in response to a request from the Content Deliver Network 122.

In some embodiments, the authentication may occur at the receiving device 118a such that the receiving device 118a does not allow the request to be sent from the receiving device 118a, or the content may not be decrypted by the receiving device 118a unless and until the receiving device 118a authenticates or receives notice of authentication using the code received from the secure remote 128a in conjunction with VOD application software running on the receiving device 118. On other embodiments, the authentication may occur directly between the secure remote 128 and the content storage system of the content delivery network 122 and/or the program distributor 106 over the communication system 108, such as when the secure remote 128 is a smart phone or other wireless device with Wi-Fi® capability and the authentication occurs over the cellular telephone network or computer network such as the Internet.

In some embodiments, only particular streaming media content programs of all those available on-demand and/or only portions (e.g., a pre-determined percentage such as 10% or 20%) of streaming media content programs available on-demand have associated segments differently encrypted using different unique encryption/decryption key pairs known or derived by the secure remote 128 as described herein. For example, this may be to provide additional security for particular higher value content, to allocate systems resources more efficiently and/or for other reasons as desirable by the program distributor 106 because the content storage system of the content delivery network 122 need not uniquely encrypt content upon each request.

Figure 4:
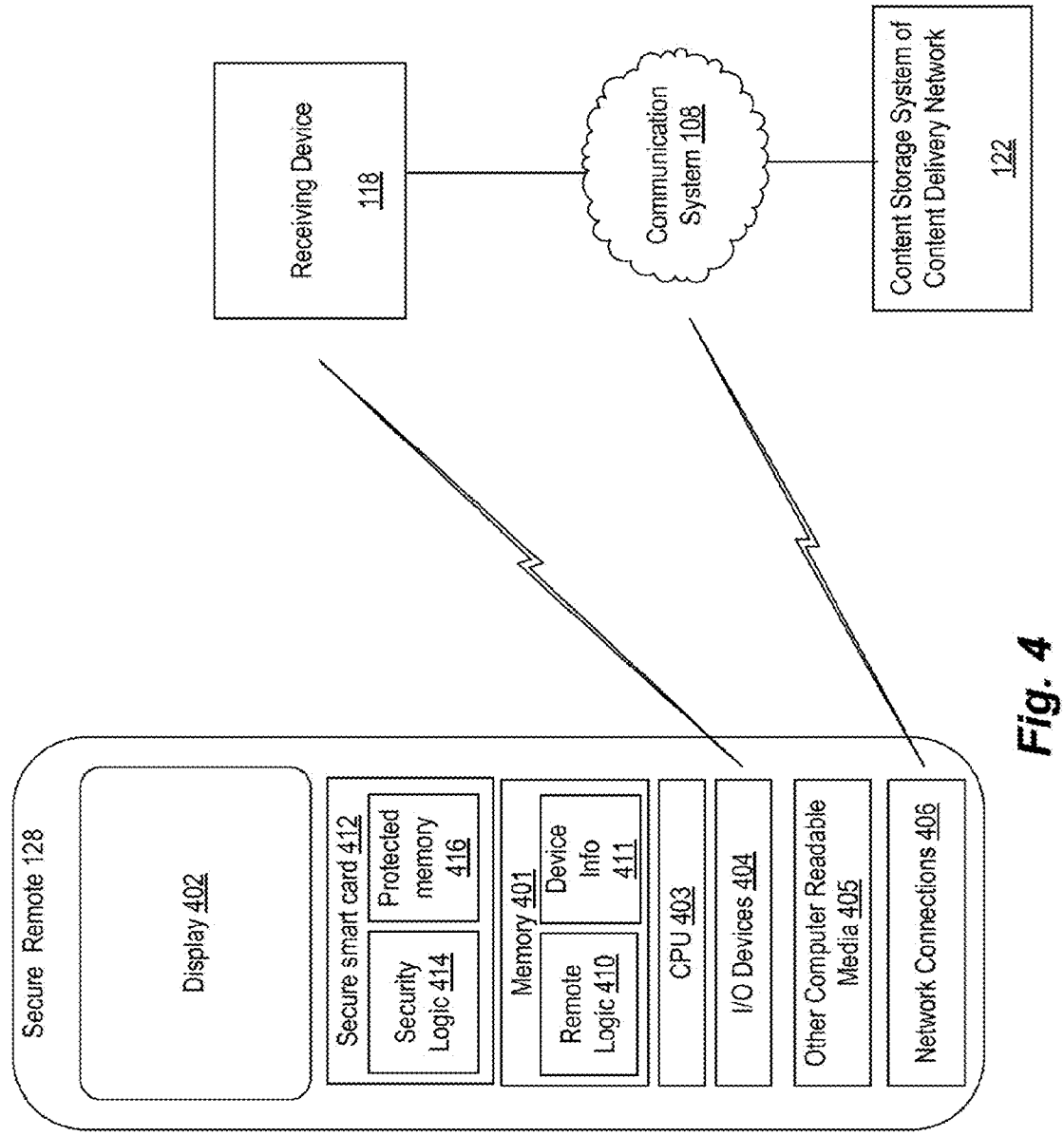
FIG. 4 is a block diagram illustrating components of an example embodiment of a secure remote-control device used in securely providing adaptive bit rate streaming media content on-demand in wireless communication with a receiving device and a presentation device, according to one example embodiment.

FIG. 4 is a block diagram illustrating components of an example embodiment of a secure remote-control device 128 used in securely providing adaptive bit rate streaming media content on-demand in wireless communication with a receiving device 118, according to one example embodiment.

In the embodiment shown, secure remote 128 comprises a computer memory ("memory") 401, a display 402, one or more Central Processing Units ("CPU") 403, other Input/Output devices 404 (e.g., keyboard, wheel input, touch pad), other computer-readable media 405 (e.g., flash memory, SIM card), and network connections 406. The display 402 may be, for example a bit-mapped LCD display, having sufficient resolution to display multiple lines of text and/or other user interface elements. The network connections 406 include one or more communication interfaces to various media devices, including but not limited to radio frequency transceivers, infrared transceivers, wireless Ethernet ("Wi-Fi") interfaces, and the like.

The secure remote 128 communicates with receiving device 118. The receiving device 118 may be a media device, television or any other device amenable to control by the secure remote 128. Example media devices include other remote-control devices, video recorders, audio systems, televisions, displays, personal computers, set-top boxes, mobile devices, and the like.

Secure remote logic 410 and device information 411 is shown residing in memory 401. In other embodiments, some portion of the contents, some of, or all of the components of the logic 410 may be stored on and/or transmitted over the other computer-readable media 405. The logic 410 preferably executes on one or more CPUs 403 and manages the secure remote 128, as described herein. Other code or programs and potentially other data/information (not shown), may also reside in the memory 401, and preferably execute on one or more CPUs 403. Of note, one or more of the components in FIG. 4 may not be present in any specific implementation. For example, some embodiments may not provide other computer readable media 405 and network connections 406.

The logic 410 performs the core functions of the secure remote 128 for controlling the receiving device 118 and also those functions as discussed with respect to FIG. 1 through FIG. 3 above. In particular, the logic 410 causes the appropriate decryption key or appropriate part of the decryption key to be sent to the receiving device 118 at the applicable time such that ordered streaming media content (such as that ordered using the secure remote 128) may be decrypted by the receiving device 118.

The secure remote 128 sends to the receiving device 118 the correct decryption key for the receiving device 118 to decrypt the particular encrypted version selected of the "special segment" to be sent to the receiving device 118. The secure remote 128 may have pre-stored corresponding encryption and/or decryption keys and/or corresponding encryption algorithms and information associating which of these correspond with each of the differently encrypted versions of the "special" segment(s) of the requested program. Such information may be stored in the protected memory 416 and/or implemented by the security logic 414 as applicable of the secure smart card 412.

Thus, in one embodiment, the secure remote 128 may use the security logic 414 to select the applicable decryption key based on the program distributor 106 and/or the content storage system of the content delivery network communicating to the secure remote control 128 an identifier of which of the differently encrypted versions of the "special segment" of the ordered program was selected by the program distributor 106 or the content storage system of the content delivery network 122 to be delivered in response to the current request or session. Alternatively, the secure remote 128 may also track what the current request is based on the program having been ordered using the secure remote 128 and use the same random or pseudo-random selection algorithm used by the program distributor 106 or the content storage system of the content delivery network 112 to determine which of the differently encrypted versions of the "special segment" of the ordered program is to be delivered from the content storage system of the content delivery network 122 to the receiving device 118 based on the current request or session. The secure remote 128 may then select from the decryption keys pre-stored in the secure remote associated with each differently encrypted versions of the "special segment" accordingly.

The respective receiving devices will then each decrypt the streaming content as it is being received according to the corresponding decryption key, part of a decryption key, contribution key or pseudo random number, communicated from the respective individual secure remote 128 to the respective receiving device 118 in conjunction with the respective request for the content.

In the present example embodiment, the secure remote 128 stores the decryption keys (or part of the decryption key) in a secure protected memory area 416 such as in a secure smart card 412 within the secure remote 128 needed to decrypt the one or more differently encrypted special segments received by the receiving device 118 from the content storage system of the content delivery network 122. For example, the security logic 414 stored on the secure smart card 412 may cause this decryption key to be selected according to the same encryption/decryption key pair generation algorithm associated with the particular differently encrypted "special segment" selected by the program distributor 106 or content storage system of the content delivery network 122 and used by the content storage system of the content delivery network 122 for the particular selected "special segment". This associated the same encryption/decryption key pair generation algorithm may also be stored in the protected memory 416 of the secure remote 128 along with the algorithm of how a particular differently encrypted "special segment" is selected based on a current request for the selection program or based on a unique identifier of the current request. Also, security logic 414 may be implemented using obfuscated code techniques, which is obfuscating computer program code (e.g., writing or generating the program code in a manner such that it is difficult for humans to understand) to conceal its purpose or its logic. This increases security by aiding in the prevention of tampering and deterring reverse engineering to gain access to the decryption key or other secret or sensitive data. The security logic 414 could also be fully or partially implemented using white box cryptography (WBC). For example, white box cryptography may use a special purpose code generator that turns a given cipher into a robust representation where the operations on the secret key are combined with random data and code in such a way that the random data cannot be distinguished from key information. In various embodiments, the security logic 414 may be hardware or software based, smart card based, or implemented using removable devices such as Secure Digital (SD) memory cards, secure personal information manager/management systems (PIMS) such as in cell phones, USB security devices, etc.

The secure remote 128 may send the stored corresponding decryption key to the receiving device 118 in response to a user selection of a button of the I/O devices 404 or other selection of an input selection item of the I/O devices 404 on the secure remote 128. The user may be prompted by the VOD application software on the receiving device 118 or other program guide displayed on the presentation device 120 to send the decryption key using the secure remote 128 at the appropriate time during the VOD ordering process, or to enter a request code or authorization code communicated via the receiving device 118 to the user based on the received current request. However, if the secure remote 128 is a two-way communication device such that it can receive communication signals from the receiving device 118, such as via the I/O devices 404 and/or network connections 406, the receiving device 118 may indicate automatically to the secure remote 128 when to transmit the decryption key and the secure remote 128 will then automatically transmit the decryption key accordingly. In some embodiments, each time the secure remote 128 automatically transmits the decryption code, it will signal an encrypted segment selection algorithm to generate the next request identifier or code in the sequence in preparation for determining what the next differently encrypted segment selection(s) will be for the next request. Alternatively, the two-way secure remote 128 may determine what the next encrypted segment selection(s) in the sequence will be upon receiving a new request from the receiving device 118 to transmit the decryption key, or may just receive this information via the network connections 406 from the security server of the content storage system of the content delivery network 122 or program distributor 106 if such are available in the secure remote 128

In an example embodiment, the logic 410 and security logic 414 are implemented using standard programming techniques. For example, the logic 410 may be implemented as a "native" executable running on the CPU 403, along with one or more static or dynamic libraries. In other embodiments, the logic 410 may be implemented as instructions processed by a virtual machine that executes as some other program. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

Also, security logic 414 could be implemented using obfuscated code techniques, which is obfuscating computer program code (e.g., writing or generating the program code in a manner such that it is difficult for humans to understand) to conceal its purpose or its logic. This increases security by aiding in the prevention of tampering and deterring reverse engineering to gain access to the decryption key or other secret or sensitive data. The security logic 414 could also be fully or partially implemented using white box cryptography (WBC). For example, white box cryptography may use a special purpose code generator that turns a given cipher into a robust representation where the operations on the secret key are combined with random data and code in such a way that the random data cannot be distinguished from key information. The security logic 414 may be hardware or software based, smart card based, or implemented using removable devices such as Secure Digital (SD) memory cards, secure personal information manager/management systems (PIMS) such as in cell phones, USB security devices, etc.

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the smart remote.

In addition, programming interfaces to the data stored as part of the device information 411, can be available by standard mechanisms such as through C, C++, C#, and Java APIs; libraries for accessing files, databases, or other data repositories; through scripting languages such as XML; or through Web servers, FTP servers, or other types of servers providing access to stored data. The device information 411 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an HDM.

Furthermore, in some embodiments, some or all of the components/portions of the logic 410 and security logic 414 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of the secure remote include other configurations. For example, the secure remote 128 may be, but is not limited to being, one or any combination of the following devices which may have a hardware or software security element: a mobile device (e.g., a smart phone or tablet device), a wireless device, a wireless device configured for two-way communication, a short range wireless device, a wireless device configured to use radio frequency wireless transmissions, a wireless device configured to use short-wave wireless transmissions, a wireless device configured to use infrared wireless transmissions, a wireless device configured to use sonic transmissions, a consumer electronics remote control device, an entertainment system remote control device, a universal remote control device, a set-top box remote control device, a television remote control device, a mobile telephone, a key fob, a universal serial bus a (USB) device, an access card, a flash memory device, a radio frequency identification device, a near filed communication device, a security token, etc.

Figure 5:
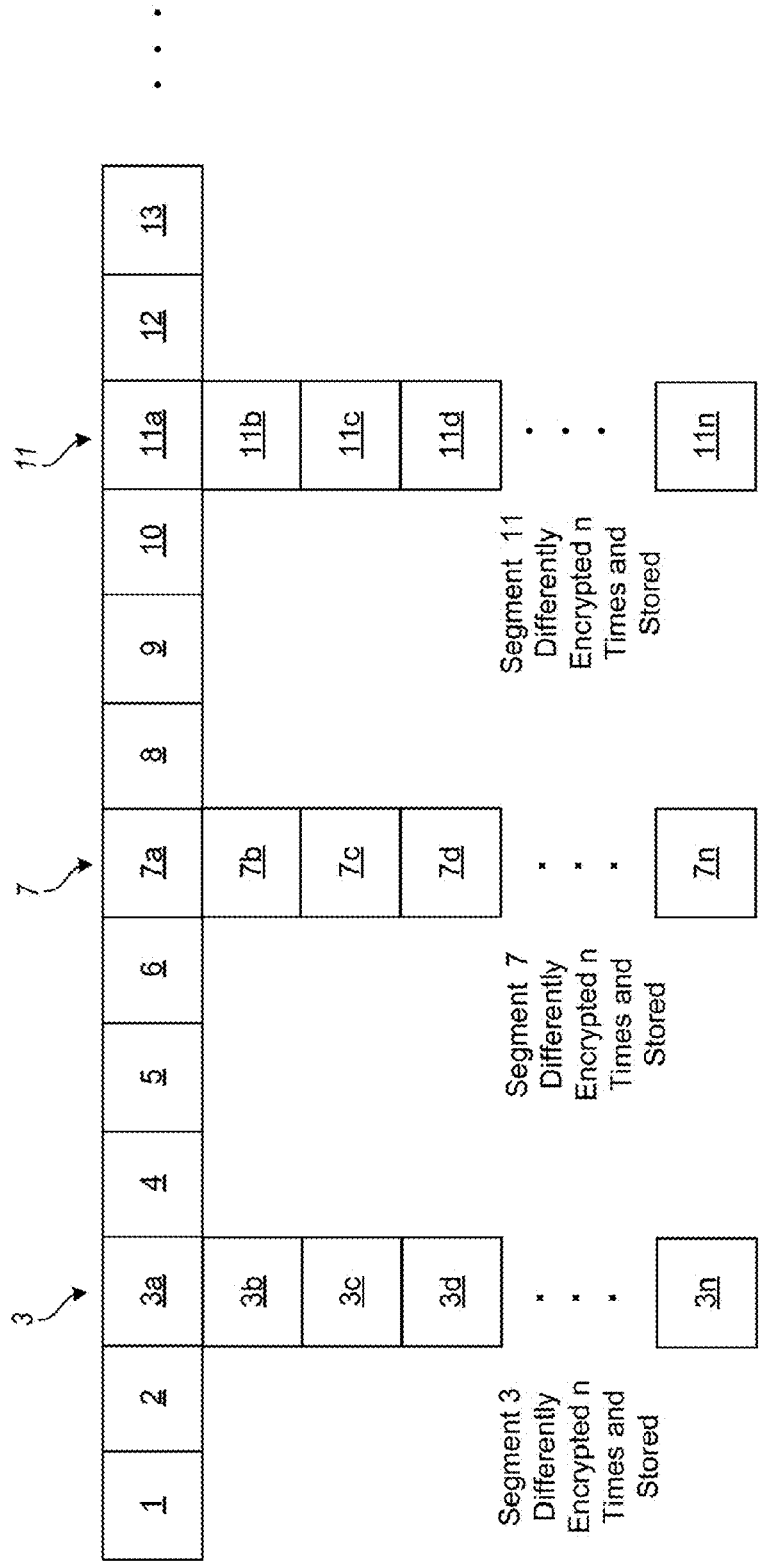
FIG. 5 is a diagram illustrating an example of how particular segments of a streaming media content program may be differently encrypted a number of times and stored in a content storage system of a content delivery network in a system for securely providing adaptive bit rate streaming media content on-demand, according to one example embodiment.

FIG. 5 is a diagram illustrating an example of how particular segments of a streaming media content program 501 may be differently encrypted a number of times and stored in a content storage system of a content delivery network 122 in a system for securely providing adaptive bit rate streaming media content on-demand, according to one example embodiment.

In particular, shown are example segments 1 through 13 of an encrypted media content program 501 stored, for example, on content storage system of the content delivery network 122. Also shown are the stored differently encrypted versions of "special" segments 3, 7 and 11. For "special" segment 3, shown are n differently encrypted versions of segment 3 (encrypted versions 3a through 3n). For "special" segment 7, shown are n differently encrypted versions of segment 7 (encrypted versions 7a through 7n). For "special" segment 11, shown are n differently encrypted versions of segment 11 (encrypted versions 11a through 11n).

In response to a request for the streaming media content program 501, during transmission of the streaming media content program 501, or prior thereto, once the content storage system of the content delivery network 122 encounters one of those "special" segments 3, 7 or 11 that have been differently encrypted a number of times and stored on the content storage system of the content delivery network 122, the content storage system of the content delivery network 122 may send a request to the program distributor 106 for information regarding which of the differently encrypted stored versions of the "special segment" of the requested program 501 to deliver to the receiving device 118 during the transmission of the requested program 501 to the receiving device 118. For example, a security server of the program distributor 106 may randomly select segment 3c to send to the receiving device based on the current request or session associated with the current request. This will be communicated by the security server of the program distributor 106 to the content storage system of the content delivery network 122 when the content storage system of the content delivery network 122 requests which encrypted version of differently encrypted segment 3 to send. The content storage system of the content delivery network 122 will then read stored encrypted version 3c of segment 3 and send it to the receiving device 118 accordingly during transmission of the requested program 501 in response to the request for the streaming media content program 501 received from the receiving device 118 and originating from the remote control 128. In this manner, the random or pseudo-random selection of which of the differently encrypted stored versions of the "special segment" of the ordered program to deliver is based on the current session, i.e., current request and associated transmission, for the requested program. In the present example embodiment, when the same special segment is requested during the current session, the same version of that special segment is delivered. For example, during the current session, when special segment 3 is requested, segment 3c will always be sent in response.

Figure 6:
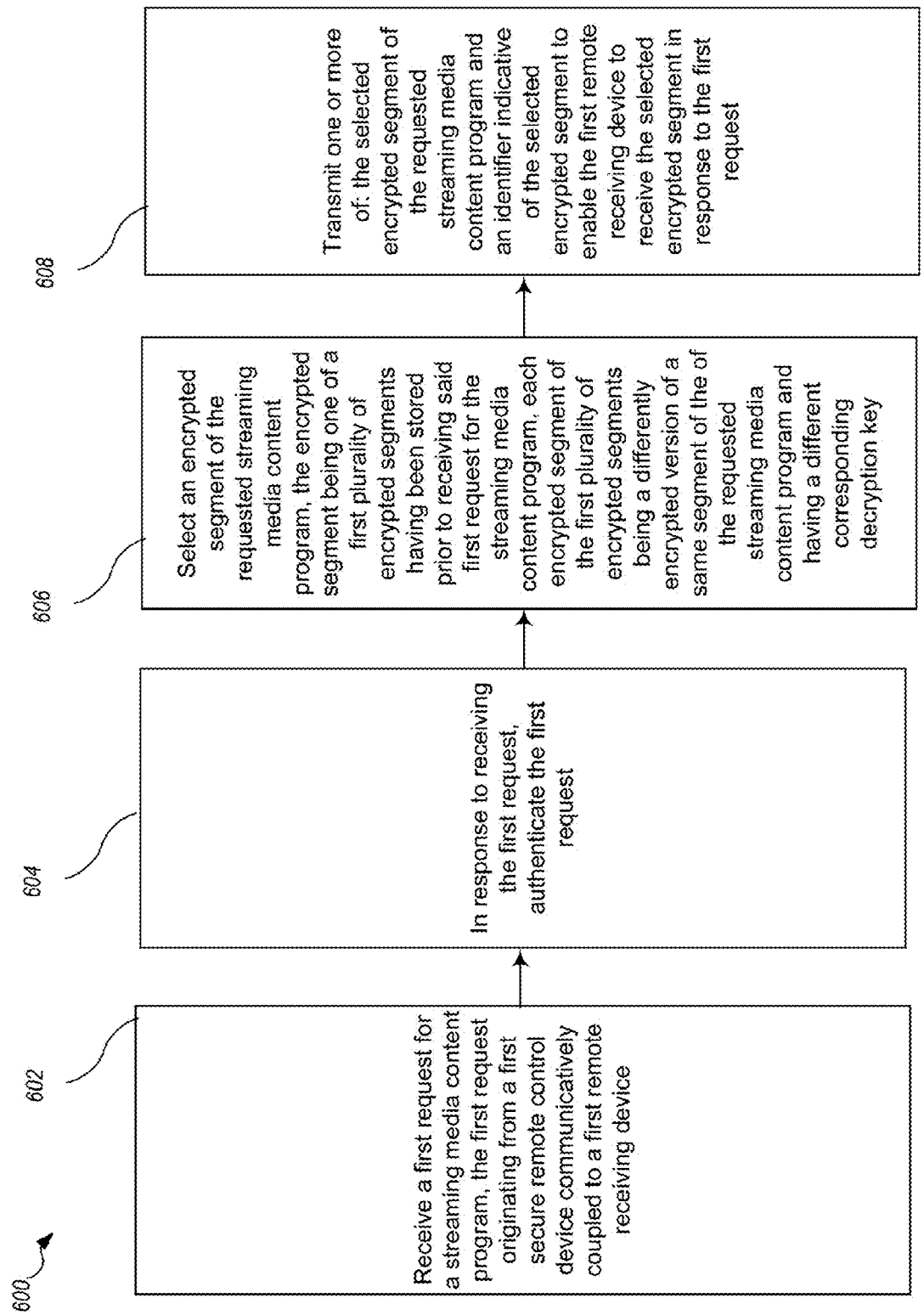
FIG. 6 is a flow diagram of a method in a security server in a media content transmission system shown in FIG. 1 through FIG. 4 of providing adaptive bit rate streaming media content on-demand, according to one example embodiment.

FIG. 6 is a flow diagram of a method 600 in a security server in a media content transmission system shown in FIG. 1 through FIG. 4 of providing adaptive bit rate streaming media content on-demand, according to one example embodiment.

At 602, the security server of the program distributor 106 of the media content transmission system receives a request for a streaming media content program from a remote receiving device 118.

At 604, the security server of the program distributor 106 of the media content transmission system, in response to receiving the first request, authenticates the first request.

At 606, the security server of the program distributor 106 selects an encrypted segment of the requested streaming media content program, the encrypted segment being one of a first plurality of encrypted segments having been stored prior to receiving said first request for the streaming media content program, each encrypted segment of the first plurality of encrypted segments being a differently encrypted version of a same segment of the of the requested streaming media content program and having a different corresponding decryption key.

At 608, the security server of the program distributor 106 transmits one or more of: the selected encrypted segment of the requested streaming media content program and an identifier indicative of the selected encrypted segment to enable the first remote receiving device to receive the selected encrypted segment in response to the first request.

Figure 7:
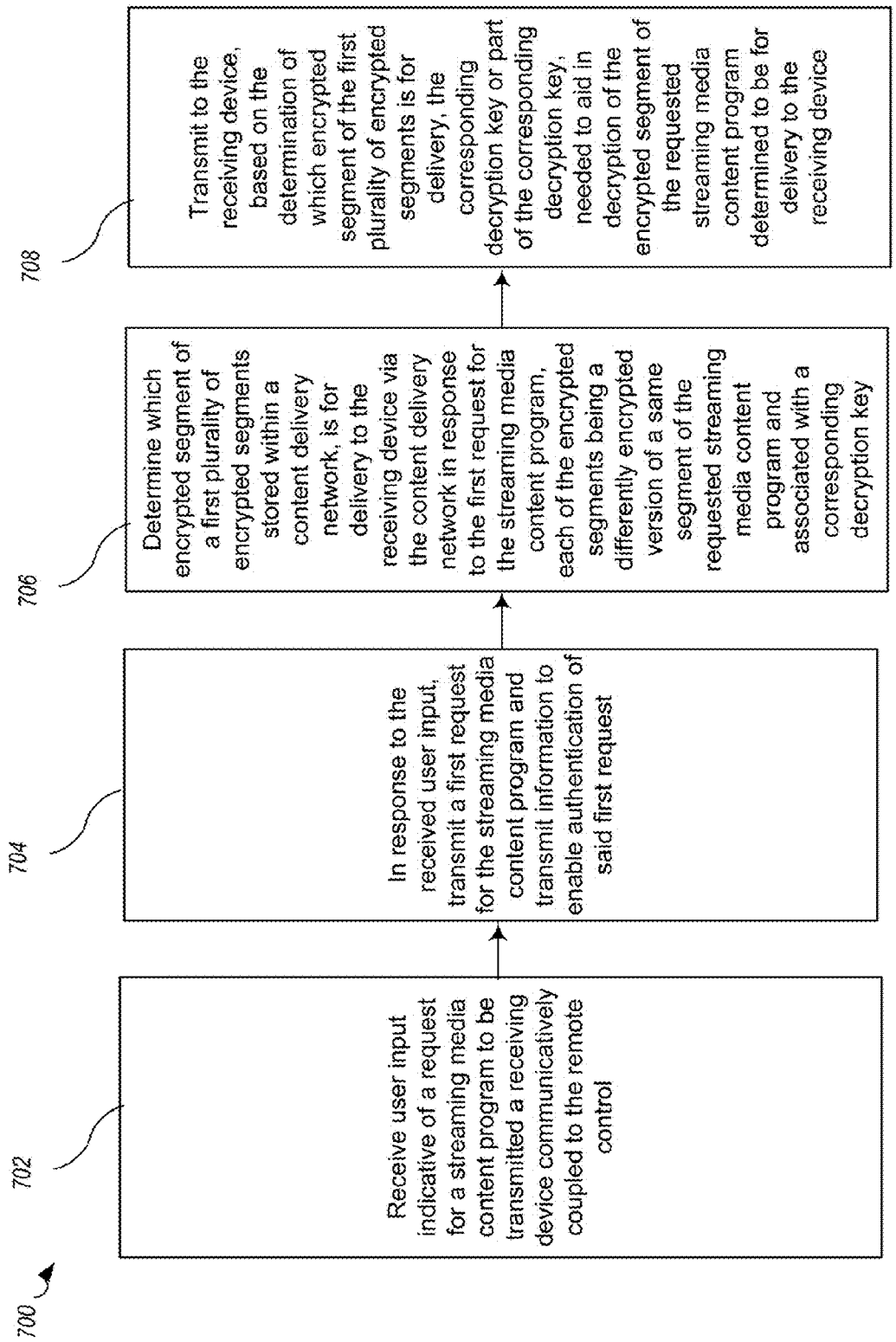
FIG. 7 is a flow diagram of method in a secure remote control shown in FIGS. 1, 3 and 4, of securely providing adaptive bit rate streaming media content on-demand, according to one example embodiment.

FIG. 7 is a flow diagram of method 700 in a secure remote control shown in FIGS. 1, 3 and 4, of securely providing adaptive bit rate streaming media content on-demand, according to one example embodiment.

At 702, the secure remote control 128 receives a first request for a streaming media content program, the first request originating from a first secure remote control device communicatively coupled to a first remote receiving device 118.

At 704, the secure remote control 128, in response to the received user input, transmits a first request for the streaming media content program and transmits information to enable authentication of said first request.

At 706, the secure remote control 128 determines which encrypted segment of a first plurality of encrypted segments stored within a content delivery network is for delivery to the receiving device 118 via the content delivery network in response to the first request for the streaming media content program, each of the encrypted segments being a differently encrypted version of a same segment of the requested streaming media content program and associated with a corresponding decryption key.

At 708, the secure remote control 128 transmits to the receiving device, based on the determination of which encrypted segment of the first plurality of encrypted segments is for delivery, the corresponding decryption key or part of the corresponding decryption key needed to aid in decryption of the encrypted segment of the requested streaming media content program determined to be for delivery to the receiving device 118.

Figure 8:
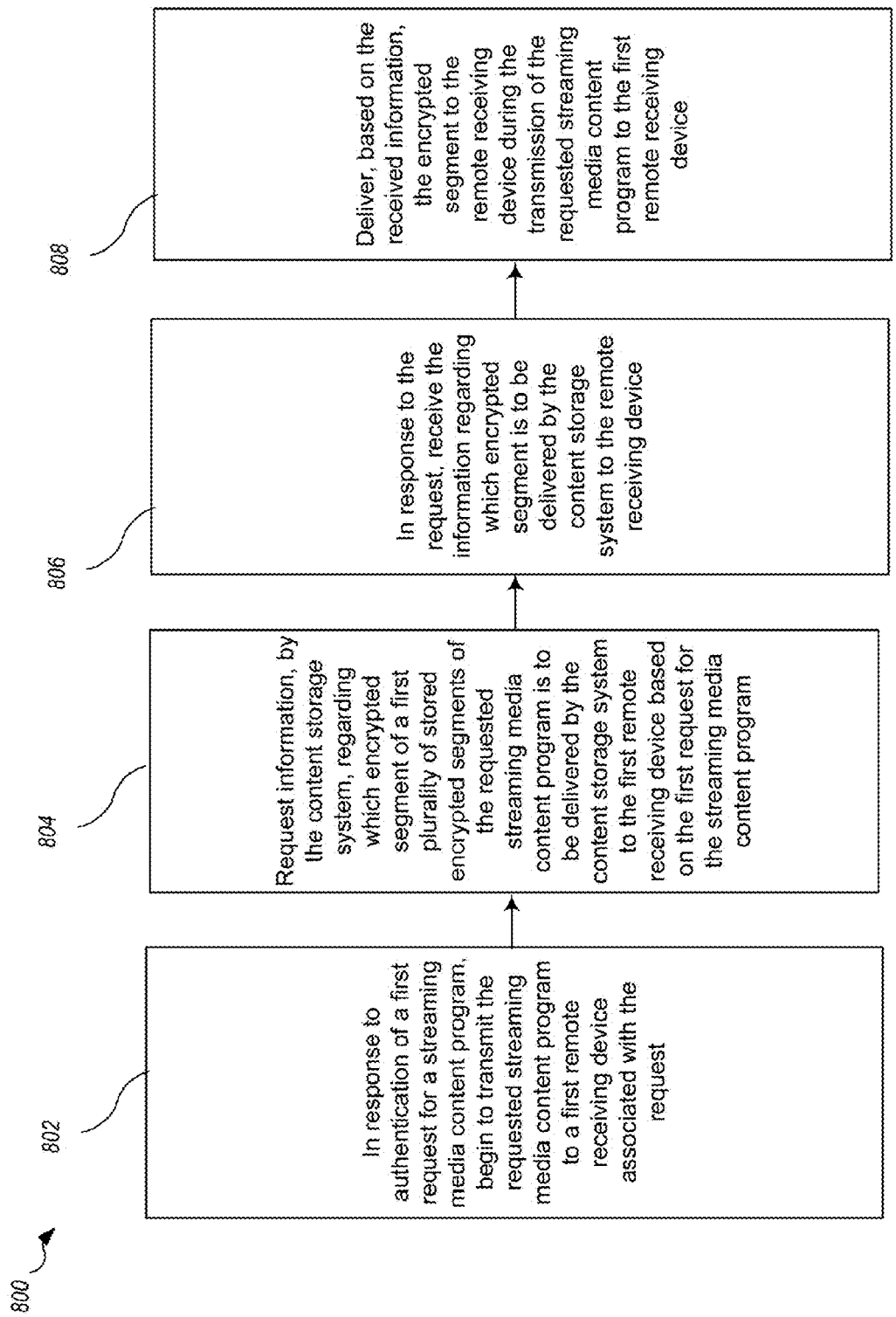
FIG. 8 is a flow diagram of method in a content storage system of a content delivery network shown in FIG. 1 through FIG. 4, of securely providing adaptive bit rate streaming media content on-demand, according to one example embodiment.

FIG. 8 is a flow diagram 800 of method in a content storage system of a content delivery network 122 shown in FIG. 1 through FIG. 4, of securely providing adaptive bit rate streaming media content on-demand, according to one example embodiment.

At 802, the content storage system of a content delivery network 122, in response to authentication of a first request for a streaming media content program, begins to transmit the requested streaming media content program to a first remote receiving device associated with the request.

At 804, the content storage system of a content delivery network 122 requests information, by the content storage system, regarding which encrypted segment of a first plurality of stored encrypted segments of the requested streaming media content program is to be delivered by the content storage system to the first remote receiving device based on the first request for the streaming media content program.

At 806, the content storage system of a content delivery network 122, in response to the request, receives the information regarding which encrypted segment is to be delivered by the content storage system to the remote receiving device.

At 808, the content storage system of a content delivery network 122, in response to the request, delivers, based on the received information, the encrypted segment to the remote receiving device during the transmission of the requested streaming media content program to the first remote receiving device.

While various embodiments have been described herein above, it is to be appreciated that various changes in form and detail may be made without departing from the spirit and scope of the invention(s) presently or hereafter claimed.

The invention claimed is:

1. A method in a media content transmission system, the method comprising:
    receiving, by a relay server of the content transmission system, a request for a streaming media content program, the request originating from a secure remote control device communicatively coupled to a remote receiving device;
    in response to receiving the request, authenticating, by the relay server, the request;
    selecting, by the relay server, an encrypted segment of the requested streaming media content program, the encrypted segment being one of a plurality of encrypted segments having been stored prior to receiving said request for the streaming media content program, each encrypted segment of the plurality of encrypted segments being a differently encrypted version of a same segment of the requested streaming media content program and having a different corresponding decryption key;

requesting, by the relay server, the selected encrypted segment from a content system of a content delivery network at which the selected encrypted segment is stored;

receiving, by the relay server, the selected encrypted segment from the content system in response to the requesting of the selected encrypted segment; and transmitting, by the relay server, the selected encrypted segment of the requested streaming media content to enable the remote receiving device to receive the selected encrypted segment in response to the request for the streaming media content program, wherein at least some of the differently encrypted versions are encrypted versions of the same segment at different bit rates and wherein the selecting the encrypted segment of the requested streaming media content program is based on a pseudo-random selection and is further based on a bit rate selected to enable the remote receiving device, based on the request for the streaming media content program, to receive the selected encrypted segment at the selected bit rate based on a varying bit rate for transmission of the streaming media content program to the remote receiving device.

2. The method of claim 1 further comprising, transmitting to the secure remote control device, by the media content transmission system, information indicative of a corresponding decryption key for the selected encrypted segment based on the received request for the streaming media content program.

3. The method of claim 2 further comprising:

before the requesting of the selected encrypted segment from the content system, translating the request for the streaming media content program to a different format understood by the content system of the content delivery network, but unknown to a client from which the request for the streaming media content program was received, such that the client from which the request was received does not know where to retrieve the selected encrypted segment off of the content system of the content delivery network.

4. The method of claim 3 wherein the client from which the request for the streaming media content program originated is the secure remote control device communicatively coupled the remote receiving device.

5. The method of claim 3 wherein the client from which the request for the streaming media content program originated is the remote receiving device.

6. The method of claim 3 wherein the streaming media content program, including the plurality of encrypted segments, is stored on the content system of the content delivery network prior to receiving the request, the content system of the content delivery network located geographically remote from the relay server.

7. The method of claim 3 wherein the content system of the content delivery network is part of the media content transmission system.

8. The method of claim 2 wherein the information transmitted to the secure remote control device indicative of the corresponding decryption key is information based on which the secure remote control device can derive the decryption key.

9. The method of claim 2 wherein the information transmitted to the secure remote control device indicative of the corresponding decryption key is an encrypted version of the corresponding decryption key or a part of the corresponding decryption key.

10. The method of claim 1 wherein the requesting, by the relay server, the selected encrypted segment from a content system includes transmitting, based on the received request for the streaming media content program, an identifier of the selected encrypted segment to a content system of a content delivery network on which the plurality of encrypted segments is stored.

11. The method of claim 1 wherein the selecting is based on a pseudo-random selection, based on the request for the streaming media content program, of an encrypted segment of the plurality of encrypted segments.

12. The method of claim 1 wherein the differently encrypted versions are stored on the content system geographically remote from the relay server.

13. The method of claim 1 wherein the differently encrypted versions include about one hundred encrypted versions of the same segment at each of the different bit rates.

14. A method in a media content transmission system, the method comprising:

sending, via a receiving device, a request for a streaming media content program to a relay server of the content transmission system;

in response to the request, receiving at the receiving device an encrypted segment of the requested streaming media content program from a content storage system via the relay server, the encrypted segment having been selected by the relay server and being one of a plurality of encrypted segments having been stored prior to receiving said request for the streaming media content program, each encrypted segment of the plurality of encrypted segments being a differently encrypted version of a same segment of the requested streaming media content program and having a different corresponding decryption key, wherein at least some of the differently encrypted versions are encrypted versions of the same segment at different bit rates and wherein the selection made by the relay server of the encrypted segment of the requested streaming media content program is based on a pseudo-random selection and is further based on a bit rate selected to enable the receiving device, based on the request for the streaming media content program, to receive the selected encrypted segment at the selected bit rate based on a varying bit rate for transmission of the streaming media content program to the receiving device; and receiving, by the receiving device, at least part of a corresponding decryption key for the encrypted segment of the requested streaming media content program from a secure remote control device communicatively coupled to the receiving device.

15. The method of claim 14 further comprising decrypting, by the receiving device, the encrypted segment of the requested streaming media content program using the at least part of the corresponding decryption key received from the secure remote control device.

16. The method of claim 14 further comprising, receiving, by the secure remote control device communicatively coupled to the receiving device, information indicative of the at least part of the corresponding decryption key based on the request for the streaming media content program.

17. A relay server of a media content transmission system, the relay sever comprising:
- a processor; and
- a non-transitory computer readable medium coupled to the processor, wherein the non-transitory computer readable medium has computer-executable instructions thereon that, when executed, cause the processor to:
  - receive a request for a streaming media content program, the request originating from a secure remote control device communicatively coupled to a remote receiving device;
  - select an encrypted segment of the requested streaming media content program, the encrypted segment being one of a plurality of encrypted segments having been stored prior to receiving said request for the streaming media content program, each encrypted segment of the plurality of encrypted segments being a differently encrypted version of a same segment of the requested streaming media content program and having a different corresponding decryption key, wherein at least some of the differently encrypted versions are encrypted versions of the same segment at different bit rates and wherein the selecting the encrypted segment of the requested streaming media content program is based on a pseudo-random selection and is further based on a bit rate selected to enable the remote receiving device, based on the request for the streaming media content program, to receive the selected encrypted segment at the selected bit rate based on a varying bit rate for transmission of the streaming media content program to the remote receiving device;
  - request the selected encrypted segment from a content system of a content delivery network at which the selected encrypted segment is stored;
  - receive the selected encrypted segment from the content system in response to the requesting of the selected encrypted segment;
  - transmit the selected encrypted segment of the requested streaming media content to enable the remote receiving device to receive the selected encrypted segment in response to the request; and
  - transmit, based on the request for the streaming media content program, information indicative of at least part of a corresponding decryption key for the selected encrypted segment to enable the remote receiving device to decrypt the selected encrypted segment.

18. The relay server of claim 17 wherein the non-transitory computer readable medium has computer-executable instructions thereon that, when executed, further cause the processor to:
- before the requesting the selected encrypted segment from the content system, translate the request to a different format understood by the content system of the content delivery network, but unknown to a client from which the request was received, such that the client from which the request was received does not know where to retrieve the selected encrypted segment off of the content system of the content delivery network.

19. The relay server of claim 17 wherein the client from which the request originated is the secure remote control device communicatively coupled the remote receiving device.

* * * * *